(12) United States Patent
Adams

(10) Patent No.: US 9,166,330 B2
(45) Date of Patent: Oct. 20, 2015

(54) THERMOPLASTIC GEL SEALANTS

(75) Inventor: Gary W. Adams, Holly Springs, NC (US)

(73) Assignee: TYCO Electronics Services GMBH, Schaffhausen (CH)

( * ) Notice: Subject to any disclaimer, the term of this patent is extended or adjusted under 35 U.S.C. 154(b) by 0 days.

(21) Appl. No.: 12/912,292

(22) Filed: Oct. 26, 2010

(65) Prior Publication Data

US 2012/0101204 A1     Apr. 26, 2012

(51) Int. Cl.
*C08L 53/00* (2006.01)
*H01R 13/52* (2006.01)
*C08L 53/02* (2006.01)
*C08L 91/00* (2006.01)
*H01B 3/22* (2006.01)

(52) U.S. Cl.
CPC .......... *H01R 13/5216* (2013.01); *C08L 53/025* (2013.01); *C08L 91/00* (2013.01); *H01B 3/22* (2013.01)

(58) Field of Classification Search
CPC ........ C08I 91/00; C08L 53/00; C08L 53/005; C08L 53/02; C08L 53/025; C08L 2205/02; C08L 2205/025; C08L 2205/03; C08L 2205/035
USPC .................................. 524/323, 505
See application file for complete search history.

(56) References Cited

U.S. PATENT DOCUMENTS

| 4,369,284 | A |   | 1/1983  | Chen |
| 4,370,432 | A | * | 1/1983  | Agarwal et al. ............ 524/216 |
| 4,716,183 | A |   | 12/1987 | Gamarra et al. |
| 4,942,270 | A |   | 7/1990  | Gamarra |
| 5,354,210 | A |   | 10/1994 | Koblitz et al. |
| 5,360,350 | A |   | 11/1994 | Koblitz et al. |
| 5,541,250 | A | * | 7/1996  | Hudson et al. ............ 524/505 |
| 5,580,265 | A |   | 12/1996 | Koblitz et al. |
| 5,691,399 | A |   | 11/1997 | Koblitz et al. |
| 5,741,843 | A |   | 4/1998  | Koblitz et al. |
| 5,844,021 | A |   | 12/1998 | Koblitz et al. |
| 6,121,354 | A | * | 9/2000  | Chronister ............ 524/262 |
| 2004/0072942 | A1 |   | 4/2004  | Chen |

FOREIGN PATENT DOCUMENTS

| EP | 0058022 A1 | 8/1982 |
| EP | 0371641 A1 | 6/1990 |
| JP | 2003182506 A | 7/2003 |

OTHER PUBLICATIONS

MSDS of FINA Vestan A360B.*
MSDS of Irganox 1010.*
MSDS of Irganox 1076.*
"Handbook of adhesives and sealants", by Edward M. Petrie, ISBN 0-07-049888-1.*
Eastman (Eastman Tackifier Center), 2014.*
The International Search Report and Written Opinion for PCT/US2011/057049, dated Jan. 16, 2012.
Notification Concerning Transmittal of International Preliminary Report on Patentability corresponding to PCT/US2011/057049, mailed May 10, 2013.

* cited by examiner

*Primary Examiner* — Wenwen Cai
(74) *Attorney, Agent, or Firm* — Merchant & Gould, P.C.

(57) ABSTRACT

Provided according to embodiments of the invention are thermoplastic gel compositions that include a block copolymer; a hydrocarbon tackifier resin; and a hydrocarbon oil. Further, in some embodiments, such compositions may include at least one antioxidant. Also provided are connectors that include a composition according to an embodiment of the invention.

16 Claims, No Drawings

US 9,166,330 B2

THERMOPLASTIC GEL SEALANTS

FIELD OF THE INVENTION

The present invention relates to thermoplastic gels. More specifically, the present invention relates to thermoplastic gels that may be used as sealants. The invention also relates to electrical connective devices that include sealants.

BACKGROUND OF THE INVENTION

Quality and durability are important factors in the design of systems for providing electrical connections, especially such systems utilized in the telecommunications and automotive industries. One criterion affecting the quality of such connections is the extent of effective electrical insulation surrounding the connection. Another important criterion is the maintenance of the connection in a moisture-free environment. The invasion of water at the connection site may be detrimental in several respects. For example, the "noise," "static" and "cross-talk" which frequently plague telecommunication systems are sometimes caused by signal leakage due to moisture at the connection site. Maintaining the connection and preventing signal loss or attenuation may be critical for high speed data transmission of up to about 100 MHz, or frequencies commonly used by high speed data transmission such as digital subscriber line (DSL) services. This type of data transmission is commonly used to transmit large quantities of data or high definition video signals. Disruptions to the connections made to transmit this type of data can have a strong negative impact on the bit error rate of the data and the distance the data is able to travel on the network. The intrusion of water may also have the obvious disadvantage of fostering corrosion and thus negatively impacting the durability of the connection.

While noise resistance, durability and moisture resistance in the face of environmental variations and other stresses is desirable in most electrical connecting devices, there are also many commercial and military applications in which electrical connections are repaired and/or modified in the field. It is desirable that such repair and/or modification be accomplished in the shortest period of time, in an economically efficient fashion and/or with a minimum of inconvenience to the field craftsperson or technician. In fact, such characteristics may also be highly desirable from the standpoint of the initial manufacture of the electrical connecting device.

Sealants that have been found to be useful in electrical connecting devices include those described in U.S. Pat. Nos. 5,354,210, 5,360,350, 5,580,265, 5,691,399, 5,741,843 and 5,844,012, each of which is hereby incorporated by reference herein in its entirety. These sealants may have significant tack, which has been thought to contribute to desirable sealant properties. However, the tack may cause the sealants to be somewhat difficult to work with both at the point of manufacture and in the field. Therefore, it would be desirable for sealants to have the desirable properties of these sealants but also have less tack and therefore better release properties.

SUMMARY OF THE INVENTION

Provided according to embodiments of the invention are thermoplastic gels that include 3 to 18 weight percent of at least one block copolymer that includes at least one non-elastomeric block and at least one elastomeric block; 2 to 15 weight percent of a hydrocarbon tackifier resin having a melting point of greater than 40° C.; and 75 to 95 weight percent of a hydrocarbon oil.

Also provided according to embodiments of the invention are connectors that include a thermoplastic gel according to an embodiment of the invention.

DETAILED DESCRIPTION OF EMBODIMENTS OF THE INVENTION

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20%, 10%, 5%, 1%, 0.5%, or even 0.1% of the specified amount. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

All patents, patent applications and publications referred to herein are incorporated by reference in their entirety. In the event of conflicting terminology, the present specification is controlling.

The embodiments described in one aspect of the present invention are not limited to the aspect described. The embodiments may also be applied to a different aspect of the invention as long as the embodiments do not prevent these aspects of the invention from operating for its intended purpose.

Thermoplastic Gel Compositions

Provided according to embodiments of the invention are thermoplastic gel compositions that include a block copolymer; a hydrocarbon tackifier resin; and a hydrocarbon oil. Further, in some embodiments, such compositions may include at least one antioxidant. In some embodiments, such thermoplastic gels may have properties, such as slump and spew resistance over a sufficiently large temperature range and suitably low tack, that may render them particularly useful in sealant applications.

Block Copolymers

Any suitable block copolymer may be used in embodiments of the invention. In some embodiments, the block copolymer includes at least one non-elastomeric portion and at least one elastomeric portion, and in some embodiments, the block copolymers are di- or tri-block copolymers. Diblock copolymers may be referred to as A-B diblock copolymers wherein A represents a block of non-elastomeric polymer and B represents a block of elastomeric polymer connected thereto. The triblock copolymers may have the general configuration A-B-A wherein the polymer predominantly contains A blocks at the end of each B block. The block copolymers may have any suitable polymeric structure, including linear, radial and/or branch structures.

Any suitable non-elastomeric polymer may be used for the A block. However, in some embodiments, the non-elastomeric A blocks may include poly (alkenyl arenes), polyurethanes or a combination therof. The non-elastomeric A blocks may comprise homopolymers or copolymers but in some embodiments are homopolymers prepared from alkenyl arenes, such as styrene, methyl styrene, vinyl xylene, ethylene vinyl xylene, isopropyl styrene, vinyl naphthalene and the like.

Any suitable elastomeric polymer may be used as the B block. For example, in some embodiments, the elastomeric B blocks include non-aromatic polyolefin, including saturated hydrocarbon polymers such as polyethylene, polypropylene and polybutylene; polyesters; polyethers; and combinations thereof. Polyolefins formed from conjugated dienes, such as butadiene and isoprene, and their partially or fully hydrogenated forms thereof may also be used for the elastomeric B block, either alone or in combination with other types of monomers. The elastomeric B block may be fully saturated or may be partially unsaturated, provided that it maintains elastomeric properties.

A particular example of a triblock polymer that may be used is a styrene ethylene/butylene triblock (ethylene butylene in the middle, styrene at both ends) copolymer, also referred to as SEBS. Another example is styrene ethylene ethylene propylene styrene triblock copolymers, also referred to as SEEPS. Particular examples of diblock copolymer that may be used include styrene ethylene/propylene, or SEP. In some embodiments, the block copolymers include elastomeric blocks in a range of about 60 to about 87 weight percent. Furthermore, in some embodiments of the invention, the block copolymer in the thermoplastic gel includes two or more different types of block copolymers.

The properties of the block copolymers affect the resulting properties of the final gel. In some embodiments of the invention, the block copolymer or combination thereof have a Shore A hardness of less than about 70, and in some embodiments, the block copolymers have a shore hardness of approximately 60. In addition, in some embodiments, the block copolymers have an elongation at break in a range of about 100% to about 1000%. In some embodiments, a single type of block copolymer may be used to achieve the desired physical properties, and in some embodiments, blends of block copolymers may be used to achieve these properties.

Any suitable concentration of block copolymer may be included in the thermoplastic gel compositions. However, in some embodiments, the gel compositions include 3 to 18 weight percent of block copolymer. This block copolymer may be one type of block copolymer or may include two or more types of block copolymers.

In some cases, the elastomeric B blocks of the block copolymers may be poorly compatible with the non-elastomeric A blocks and form a microscopic two-phase morphology consisting of domains of glassy end blocks interconnected by flexible mid-block chains. The physical elastomeric network structure of such copolymers is reversible, and heating the polymer above the end-block glass transition temperature will temporarily disrupt the structure, which can be restored by lowering the temperature.

In particular embodiments, the block copolymer includes both a diblock and a triblock copolymer. The ratio of the diblock and triblock copolymer may be varied to obtain optimal properties. For example, in some embodiments, the diblock copolymer to triblock copolymer ratio may be in a range of 12:1 to 1:1. In some embodiments, the diblock copolymer has an elongation at break in a range of about 50 to about 300%. In some embodiments, the triblock copolymer has an elongation at break in a range of 300 to 1000%. In some embodiments, a composite formed by the tri and the diblock copolymer has an elongation at break in a range of 80 to 500%. Examples of diblock copolymers include Kraton® G1701H, G1702H, Septon™ S1001 and the like. Examples of triblock copolymers include Kraton® G1651H, G1652M, G1654H, Septon™ S8004 and S2006. Kraton polymers may be obtained from Kraton Performance Polymers Inc. and Septon™ polymers may be obtained from Kuraray Co. Ltd. Other block copolymers that may be suitable in embodiments of the invention include those described in U.S. Pat. Nos. 4,716,183 and 4,942,270, 4,369,284, the relevant portions of which are herein incorporated by reference.

Hydrocarbon Oil

Any suitable hydrocarbon oil may be used. In some embodiments of the invention, the oil is a paraffinic oil, a napthenic oil or a combination thereof. The hydrogenated or hydrotreated oils typically represent the best compromise between low cost and desirable physical properties. However, in some embodiments, synthetics oils, such as those based on polyalpha olefins, can also be used. In particular embodiments, the hydrocarbon oil has a flashpoint in a range of 400° F. to 550° F. Furthermore, in particular embodiments, the hydrocarbon oil has a viscosity in a range of 20 to 250 cSt at 40° C. as measured by ASTM D445. In addition, in some embodiments, the pour point is less than −10° C. Examples of hydrocarbon oils include Chevron Paralux® 2401, 6001 and any mixture thereof (e.g., a 50/50 mixture of Paralux® 2401 and 6001). Other hydrocarbon oils include Hydrobrite® 380 PO and Semtol® 400 and Kaydol® from Sonneborn, Inc.

Any suitable concentration of hydrocarbon oil may be used. However, in some embodiments, the hydrocarbon oil is present in the gel at a concentration of about 75 to about 95 weight percent.

Hydrocarbon Tackifier Resin

Any suitable solid hydrocarbon tackifier resin may be used. However, the tackifier resin should have a melting point above about 40° C. In some embodiments, the hydrocarbon tackifier resin has a melting point above 90° C. The hydrocarbon tackifier is a hydrocarbon based resin that is soluble in the hydrocarbon oils described herein. Examples of such resins include Akrochem® HR 768 and HR 770 and terpene phenolic resins.

Antioxidants

The antioxidant use and choice may play a role in forming lower tack surfaces, as the bloom of the antioxidant to the surface of the gel may contribute to the reduction in tack. In particular embodiments, the antioxidant additives may include a hindered phenol. In some embodiments, the antioxidant includes a phenol organic, such as those from BASF, for example, Irganox® 1010 ([3-(3,5-di-tert-butyl-4-hydroxyphenyl)-proprionate]), Irganox® 1076 (Octadecyl-3-(3,5-di-tert-butyl-4-hydroxyphenyl)-proprionate) and Irganox® 565 (2,6-di-tert-butyl-4-(4,6-bis(octylthio)-1,3,5-triazin-2-ylamino)phenol). The antioxidant additives may also include a hindered phenol phosphate, such as Irgafos® 168 (Tris(2,4-di-tert-butylphenyl)phosphate). Hindered phenols include compounds that have a phenol group having bulky substituents, (e.g., a tert-butyl, isopropyl) on the phenolic ring, particularly in the ring positions close to the hydroxyl group.

The antioxidant may be chosen to have solubility sufficient to combine with the hydrocarbon oil, yet be sufficiently insoluble to allow for the antioxidant bloom to form on the surface of the gel, thus providing a less tacky surface. Other hindered phenol antioxidants having long chain hydrocarbon tails and those having the shorter ester type hindered phenol may also be useful in embodiments of the invention. In fact, in some embodiments, any antioxidant may be used, including those that are sterically hindered and/or include more polar structures (e.g., ester linkages, ether, amines, and the like), provided that the antioxidant blooms on the surface within 30 days at room temperature or after heat curing for 0 to 48 hours at a temperature less than the melting temperature, the specific time depending on the thermoplastic gel and/or the temperature used for heat curing.

Any suitable concentration of antioxidants may be used. However, in some embodiments, the antioxidants may be present in the thermoplastic gel at a concentration in a range of 0.3 to 5 weight percent, and in particular embodiments, at a concentration in a range of about 1 to about 3 weight percent. In some embodiments, the antioxidant may include a combination of antioxidants. For example, in some embodiments, the antioxidant includes Irganox® 1010, Irganox® 1076 and Irgafos® 168, each at a concentration in a range of 0.1 to 1 weight percent.

Other Additives

In some embodiments of the invention, the thermoplastic gel may include other additives. Such components may provide other desirable properties to the sealant composition without substantially detracting from the beneficial characteristics described herein.

In some embodiments of the invention, one or more corrosion inhibitors may be included in the sealant composition. For example, in some embodiments, the corrosion inhibitors are present at a concentration in a range of 0 to 0.1 weight percent. Corrosion inhibitors are available in wide variety of types and grades and from a wide variety of sources, and any suitable corrosion inhibitor may be used in the sealant compositions described herein. In some embodiments, the corrosion inhibitor is a benzotriazole, such as those that are available from PMC Incorporated under the trade designation COBRATEC® (e.g., COBRATEC® BZ FG and COBRATEC® 99). As another example, in some embodiments, the corrosion inhibitor may include a salt of dinonyl-napthylenesulfonic acid, such as those available under the trade name NA-SUL® from King Industries, Inc. in Norwalk, Conn.

In some embodiments of the invention, sealants include light and heat stabilizers. Any suitable light and heat stabilizers may be used. One such stabilizer is available from Cytec Industries, Inc. under the trade designation CYASORB® light stabilizer. In some embodiments, the light and/or heat stabilizer may present at a concentration in a range of 0 to 0.1 weight percent.

In some embodiments of the invention, sealants include fungicides and/or other antimicrobials. Any suitable antimicrobial agent may be used. However, examples of antimicrobial agents that may be included in the sealant compositions described herein include VINYZENE™ from Dow Chemical Corporation, and thiabendazole such as METASOL® TK-100, such as that from Lanxess Corporation. Any suitable concentration of antimicrobial agent may be used. However, in some embodiments, the antimicrobial agent is present in the gel at a concentration of 0.1 to 1 weight percent.

Other additives known to those of skill in the art of sealants may be included if appropriate for combination with the thermoplastic gel according to an embodiment of the invention. For example, pigments, such as UMB E770 (blue pigment obtainable from a variety of sources), may be included, provided that they do not substantially affect the properties of the gel. In some embodiments of the invention, the sealant compositions may also include a thickening agent such as silica (e.g., fumed silica). Silica may also serve to act as a temperature stabilizing agent. Such materials are available as fully hydrophobized surface treated amorphous silicas from Cabot Corporation under the designations CAB-O-SIL®, such as CAB-O-SIL® TS610 and CAB-O-SIL® TS-530 and from Degussa Corporation under the designation AEROSIL® R-974. Hydrophilic amorphous silicas are available from Cabot Corporation under the trade designation CAB-O-SIL M-5® and from Degussa Corporation under the trade designation AEROSIL® 200. In some embodiments, incorporation of minor amounts of less than about 8% by weight, of silica into the present compositions may favorably control the rheology and cohesive strength of the sealant.

Properties of Thermoplastic Gel Sealants

The physical characteristics of the present compositions vary according to, among other conditions, the temperature of the composition. As will be understood by those skilled in the art, sealant compositions may be operative over definite time and temperature service ranges. It is desirable that the sealant compositions maintain specified characteristics substantially over an entire range of expected operating temperatures. For example, it is desirable that the thermoplastic gel sealants described herein are slump and spew resistant, even at the relatively high end of the operating temperature range.

Applicants have discovered that the sealants of the present invention are capable of being flowable and thus easily processed at moderately elevated temperatures without sacrificing the operating requirements of the sealant. Unless otherwise specifically indicated, the term "flowable" refers to the ability of the compositions to become fluent or viscid upon the application of shear stress or pressure.

The flowability of the present sealants is measured by exposing about 50 grams of the sealant in the cylindrical chamber of a standard hot-melt gun to an extrusion pressure of about 30 psi at about 163° C. for about 3 seconds and measuring the weight of sealant extruded from the gun. For purposes of defining flow conditions, the extrusion pressure is used as an expression of shear stress. The flowability measurements presented herein are obtained using a hot-melt extrusion gun available from Fastening Technology, Inc, of Charlotte, N.C. sold under the trade name PAM-Model 500-E. Such a gun is provided with a 0.048 inch inside diameter type B nozzle. Although the amount of flow may vary widely within the scope of the present invention, in some embodiments of the invention, the flow may be at least about 0.1 g per 3 sec (2 g/min), and in some embodiments, at least about 0.5 g per 3 sec (10 g/min) of flow at about 160° C.

The spew resistance (oil retention) of a sealant is measured according to the protocol expressed in Federal Specification #321.1. Generally, measurement of spew resistance includes loading the defined weight of sealant into a conical container having walls composed of a stainless steel mesh as specified according to the federal standards. The amount of material which migrates from the conical container after the specified time period at the specified temperature is a measure of the ability of the present sealants to resist spewing or exudation of the oil portions thereof. The spew resistance is reported herein as percent extender retention and is determined by dividing the sealant weight contained in the conical container after the test by the weight of sealant at the start of the test. Although the amount of spew resistance may vary widely within the scope of the present invention, in some embodiments, compositions exhibit a spew resistance of at least about 99% extender retention at about 80° C., and in some embodiments, at least about 99.5% at about 80° C.

Slump resistance is measured by a modified version of ASTM Test method D2202. In general, the unmodified ASTM Test D2202 requires formation of a cylindrical cavity in a metal sheet or slab by withdrawing a mating cylindrical body or piston from the slab. This cavity is then filled with the material to be measured. According to the unmodified version of the test method, the slab is placed in a vertical position, and the piston is then driven forward to occupy one-half of the original cavity space, thus causing about one-half of the original test material volume to be displaced past the surface of the slab. Upon heating to the test temperature, the amount of downward droop or movement of the displaced material is measured. According to the modification utilized herein, the piston is driven forward to occupy all of the original cavity volume such that the face of the piston is flush with the surface of the slab. As a result, the entire body of sealant is displaced from the cavity. In this way, the modified ASTM test D2202 measures not only the slump resistance of the sealant material, but also its adhesive properties. Although the amount of slump resistance may also vary widely within the scope of the present invention, in some embodiments, the present compositions exhibit a slump resistance of less than about 0.5 in. of slump, and in particular embodiments, less than about 0.2 in. of slump at about 80° C.

Although the operating temperature range of any particular sealant will depend upon numerous factors, in some embodiments, the present sealant compositions have an operating temperature range of from about −40° C. to about 125° C.

In some embodiments of the invention, for temperatures of from about −40° C. to about +80° C., the compositions exhibit an elastic memory of at least about 100 to 150%, and in some embodiments, at least about 200 to 300%. As the term is used herein, elastic memory refers to the ability of a composition to return to about its original configuration after being subjected to the designated extent of elongation. The high degree of elastic memory may provide sealants with a highly advantageous "self-repairing" property. That is, the present sealants will deform to accommodate stress exerted by, for example, the insertion of an electrical wire into a mass of the sealant. Upon removal of the wire and hence the accompanying stress, the exceptional elastic memory of the present compositions causes the mass of sealant to return to substantially its original shape and thereby to substantially fill the void resulting from the removal of the wire. In addition, the sealants of the present invention may maintain their bond with and move with the wires when flexed functionally maintaining the integrity of the seal.

Although applicants do not wish to be necessarily bound by or limited to any particular theory, it is believed that the ability of at least some of the compositions to exhibit the above-noted combination of beneficial properties is due, at least in part, to the physical and chemical relationship between the components of the present composition. In particular, the combination of a block copolymer and hydrocarbon oil according to embodiments of the present invention is believed to contribute to the beneficial properties of the compositions. For example, it is contemplated that the mixture of the diblock and triblock elastomeric thermoplastic polymers according to some embodiments includes an interpenetrating polymer network (IPN). It is believed that the presence of such a polymer network, in some cases, in the presence of optional inorganic gelants, may maintain the extender portion of the present compositions in a stable dispersed, colloidal, gelled and/or networked (reticulated) or fused state in which exudation or spewing of the extender is strongly inhibited. In addition, it is believed that such a configuration contributes to the high cohesive strength of the present compositions. It is also believed that by the inclusion of a solid tackifier resin and suitable antioxidant(s), the sealants may not only have these beneficial properties but also have relatively low surface tack.

Methods of Making Thermoplastic Gel Sealants

Thermoplastic gel sealants according to embodiments of the invention may be made by any suitable process. However, in some embodiments, the gels are made using a batch process, such as using a heated multi-shaft mixer and/or a planetary mixer. Alternatively, in some embodiments, a continuous processes may be used, including a single screw extruder, twin screw extruder, or a heated solid/liquid injection system such as a Ross SLIM system or other types of inline high shear mixers. In some embodiments, continuous mixing systems are advantageous compared with batch systems for high volume production.

Connectors

It is contemplated that the desirable properties of the present compositions will be advantageous in a wide variety of connectors, and all such connectors containing the present compositions are provided according to embodiments of the invention. The connecting devices that may include a sealant or thermoplastic gel according to an embodiment of the invention include those described in U.S. Pat. Nos. 5,354,210, 5,360,350, 5,580,265, 5,691,399, 5,741,843 and 5,844,012, which are all incorporated herein by reference in their entirety.

In some embodiments, provided are moisture proof, temperature resistant and/or noise resistant connectors for sealing electrical and/or transmission connections therein. In some embodiments of the present invention, provided is a connector body having a terminal for accepting and electrically connecting to the transmitter inserted appropriately into the connector body and a sealant composition disposed along or adjacent to the terminal of the connector body. In order to maximize the sealing ability of the connector, the connector body may include a substantially closed housing or container, and the container may be substantially filled with sealant composition. In such embodiments, the container may include access for allowing entry of the transmitter into the connector body for contact with the terminal and the sealant composition. In some embodiments, access for the container includes an access opening therein.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

EXAMPLES

A thermoplastic gel sealant was formed using the amounts of the components, as shown below. The following procedure for mixing the gel sealant using a laboratory 1 liter double planetary mixer was used to make the proceeding examples (See Tables 1-4). The quantity of sealant produced was approximately 500 g per batch. First, all of the hydrocarbon oil was added. Then, the mixer jacket was heated to approximately 160° C. and the mixer blades were adjusted to 100 RPM. As soon as the hydrocarbon oil reached 150° C., antioxidant(s) and other additives were added. The block copolymers were slowly added to the hot oil while continuing to mix. The mixing continued until the block copolymers were melted (approximately 30 minutes) and there were no visible particles at a magnification of 10×. The gel sealants were then dispensed into containers for product or testing.

TABLE 1

| Component | Chemical Name | Weight Percent |
|---|---|---|
| ParaLux ® 2401 | Paraffinic Process Oil | 42.5 |
| ParaLux ® 6001 | Paraffinic Process Oil | 42.5 |
| Irganox ® 1076 | Octadecyl-3-(3,5-di-tert.butyl-4-hydroxyphenyl)-propionate | 0.25 |
| Irganox ® 1010 | Pentaerythritol tetrakis(3-(3,5-di-tert-butyl-4-hydroxyphenyl)propionate) | 0.375 |
| Irgafos ® 168 | Tris(2,4-di-tert-butylphenyl) phosphite | 0.375 |
| Kraton ® G1701H | SEP diblock copolymer | 7.6 |
| Kraton ® G1651H | SEBS triblock copolymer | 1.0 |
| Akrochem ® HR 770 | Hydrocarbon resin tackifier | 5.0 |
| Cobratec ® 123 BZ FG | benzotriazole | 0.1 |
| Metasol ® TK-100 | thiabendazole | 0.05 |
| UMB E770 | Pigment blue 29, sodium alumino silicate sulfate complex | 0.1 |

TABLE 2

| Component | Chemical Name | Weight Percent |
|---|---|---|
| ParaLux ® 2401 | Paraffinic Process Oil | 40.4 |
| ParaLux ® 6001 | Paraffinic Process Oil | 40.4 |
| Irganox ® 1010 | Pentaerythritol tetrakis(3-(3,5-di-tert-butyl-4-hydroxyphenyl)propionate) | 0.5 |
| Kraton ® G1701H | SEP diblock copolymer | 7.6 |
| Kraton ® G1651H | SEBS triblock copolymer | 1.0 |
| Akrochem ® HR 770 | Hydrocarbon resin tackifier | 10.0 |
| Metasol ® TK-100 | thiabendazole | 0.05 |

TABLE 3

| Component | Chemical Name | Weight Percent |
|---|---|---|
| ParaLux ® 6001 | Paraffinic Process Oil | 80.8 |
| Irganox ® 1010 | Pentaerythritol tetrakis(3-(3,5-di-tert-butyl-4-hydroxyphenyl)propionate) | 0.50 |
| Kraton ® G1701H | SEP diblock copolymer | 7.6 |
| Kraton ® G1651H | SEBS triblock copolymer | 1.0 |
| Akrochem ® HR 770 | Hydrocarbon resin tackifier | 10.0 |
| Metasol ® TK-100 | thiabendazole | 0.05 |
| UMB E770 | Pigment blue 29, sodium alumino silicate sulfate complex | 0.1 |

TABLE 4

| Component | Chemical Name | Weight Percent |
|---|---|---|
| ParaLux ® 2401 | Paraffinic Process Oil | 40.7 |
| ParaLux ® 6001 | Paraffinic Process Oil | 40.7 |
| Irganox ® 1076 | Octadecyl-3-(3,5-di-tert.butyl-4-hydroxyphenyl)-propionate | 0.25 |
| Irganox ® 1010 | Pentaerythritol tetrakis(3-(3,5-di-tert-butyl-4-hydroxyphenyl)propionate) | 0.25 |
| Irgafos ® 168 | Tris(2,4-di-tert-butylphenyl) phosphite | 0.375 |
| Kraton ® G1701H | SEP diblock copolymer | 7.6 |
| Kraton ® G1651H | SEBS triblock copolymer | 1.0 |
| Akrochem ® HR 768 | Hydrocarbon resin tackifier | 9.0 |
| Metasol ® TK-100 | thiabendazole | 0.05 |
| UMB E770 | Pigment blue 29, sodium alumino silicate sulfate complex | 0.1 |

The sealants formed had the properties listed in Table 5:

TABLE 5

| Property | Test Method | Unit | Value |
|---|---|---|---|
| Copper Corrosion | ASTM D4048 | Strip rating | 1B |
| Dropping Point | ASTM D566 | ° C. | 180 |
| Dielectric strength | ASTM D 877 | V/mm | ≥7800 |
| Dielectric constant | ASTM D 150 | — | 3.75 |
| Volume resistivity | ASTM D 257 | ohm-cm | 1.0e12 |
| Viscosity 175° C. | ASTM D 1824 | cPs | 30,000-60,000 |
| Fungus Resistance | ASTM G 21 | Rating | 0, no growth |
| Cone Penetration, 150 g load | ASTM D217 | 0.1 mm | 225-325 |
| Slump test, 24 hr at 80° C. | ASTM D2202, modification described | mm | ≤0.2 |
| Tack | Force required to remove 6.35 mm steel ball from a 4 mm depth in the gel at a rate of 2 mm/s | g | 11-15 |
| Appearance | Visual, 10X magnification | — | Clear to translucent, no visible undissolved particles |

At 25° C., a lessening of the surface tack (blooming), was observed after 7 days. After 14 days at 25° C., the surface of the gel was substantially non tacky to the touch. A similar effect was noted at elevated temperatures (up to 60° C.). 24 hours after aging at 60° C., the gel became non tacky at the surface. The surface was coated with a thin film which was probably antioxidants or a mixture of antioxidants and other non tacky additives.

I claim:

1. A thermoplastic gel comprising:
    3 to 18 weight percent of at least one block copolymer comprising
    at least one diblock copolymer that comprises polystyrene and a saturated hydrocarbon polymer; and
    at least one triblock copolymer that comprises polystyrene and a saturated hydrocarbon polymer, wherein the ratio of the at least one diblock copolymer to the at least one triblock copolymer is 7.6:1;
    2 to 15 weight percent of a hydrocarbon tackifier resin having a melting point of greater than 40° C.;
    75 to 95 weight percent of a hydrocarbon oil;
    at least one antioxidant; and
    an antimicrobial agent,
    wherein the gel exhibits an antioxidant bloom on the surface of the gel within 30 days at room temperature.

2. The thermoplastic gel of claim 1, wherein the hydrocarbon oil is a paraffinic oil having a flash point in a range of 400° F. to 550° F.

3. The thermoplastic gel of claim 1, wherein the at least one antioxidant comprises a hindered phenol.

4. The thermoplastic gel of claim 1, wherein the at least one antioxidant is present in the thermoplastic gel at a concentration in a range of about 0.3 to about 5 weight percent.

5. The thermoplastic gel of claim 1, wherein the at least one antioxidant forms a bloom on the surface of the gel within 24 hours after aging at 60° C.

6. The thermoplastic gel of claim 1, wherein the thermoplastic gel has a tack in a range of 3 to 25 g, as measured by the force required to remove 6.35 mm steel ball from a 4 mm depth in the gel at a rate of 2 mm/s.

7. The thermoplastic gel of claim 1, further comprising at least one additional additive selected from the group consisting of a corrosion inhibitor, a light stabilizer, a heat stabilizer, a pigment and a thickening agent.

8. The thermoplastic gel of claim 1, wherein the cone penetration of the thermoplastic gel is in a range of 225 to about 325, as determined by ASTM D217.

9. The thermoplastic gel of claim 1, wherein the antimicrobial agent is a fungicide.

10. The thermoplastic gel of claim 9, wherein the fungicide is thiabendazole.

11. The thermoplastic gel of claim 1, wherein the hydrocarbon tackifier resin has a melting point of greater than 90° C.

12. The thermoplastic gel of claim 1, wherein the at least one triblock copolymer is present at 1 wt %.

13. The thermoplastic gel of claim 6, wherein the thermoplastic gel has a tack in a range of 11 to 15 g, as measured by the force required to remove 6.35 mm steel ball from a 4 mm depth in the gel at a rate of 2 mm/s.

14. The thermoplastic gel of claim 1, wherein the at least one diblock copolymer is present at 7.6 wt %.

15. A connector that comprises the thermoplastic gel of claim 1.

16. The connector of claim 15, wherein the connector is a coax connector, data connector, telecommunications cable and/or an electrical connector.

* * * * *